(12) United States Patent
Becker et al.

(10) Patent No.: US 7,435,918 B2
(45) Date of Patent: Oct. 14, 2008

(54) UNDERFRAME OF A MOTOR VEHICLE SEAT WITH WEIGHT SENSORS

(75) Inventors: Burckhard Becker, Solingen (DE); Michael Weber, Solingen (DE); Peter Margiciok, Oberhausen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 12 days.

(21) Appl. No.: 11/485,936

(22) Filed: Jul. 13, 2006

(65) Prior Publication Data
US 2007/0012487 A1    Jan. 18, 2007

(30) Foreign Application Priority Data
Jul. 15, 2005  (DE) ..................... 10 2005 033 730

(51) Int. Cl.
*B60R 21/015*  (2006.01)
*G01G 21/02*  (2006.01)
*G01G 21/28*  (2006.01)

(52) U.S. Cl. .............. 177/136; 177/144; 180/273; 280/735

(58) Field of Classification Search ................. 177/136, 177/144; 180/273; 280/735
See application file for complete search history.

(56) References Cited

U.S. PATENT DOCUMENTS 4,940,254 A * 7/1990 Ueno ..................... 280/801.2
5,991,676 A * 11/1999 Podoloff et al. ............... 701/45
6,039,344 A * 3/2000 Mehney et al. .............. 280/735
6,969,809 B2 * 11/2005 Rainey ........................ 177/136
7,373,846 B2 * 5/2008 Furukawa et al. ........ 73/862.621
2008/0083290 A1 * 4/2008 Stadler .................. 73/862.625

FOREIGN PATENT DOCUMENTS

| DE | 196 02 088 C2 | 7/1997 |
| DE | 199 05 363 C1 | 5/2000 |
| DE | 199 20 378 A1 | 11/2000 |
| DE | 101 22 316 A1 | 11/2002 |

* cited by examiner

*Primary Examiner*—Randy W Gibson
(74) *Attorney, Agent, or Firm*—McCarter & English, LLP

(57) ABSTRACT

The underframe of a motor vehicle seat is equipped with weight sensors for sensing a weight load on the motor vehicle seat. The weight sensors are interposed between a first structure part, such as a seat profile of a longitudinal guide, and a second structure part, such as a console or a seat shell, and sense the weight exerted through the second structure part on the first structure part. The weight sensors are fastened to the first structure part and comprise sensor bolts projecting upward. Holes for the sensor bolts are provided in the second structure part. The sensor bolts extend through the holes and one nut, which forms a surrounding grip around the holes, is associated with each of the sensor bolts. The holes of the second structure part each comprise one hole region that surrounds the holes and is configured as a cap.

20 Claims, 4 Drawing Sheets

UNDERFRAME OF A MOTOR VEHICLE SEAT WITH WEIGHT SENSORS

CROSS-REFERENCE TO RELATED APPLICATIONS

This application claims priority to German Application No. DE102005033730.9, filed Jul. 15, 2005, the contents of which are expressly incorporated by reference in their entirety as part of the present disclosure.

BACKGROUND

The application relates to an underframe of a motor vehicle seat, the underframe is equipped with weight sensors for sensing a weight load on the motor vehicle seat.

A motor vehicle seat is known from DE 199 05 363 C1 in the seat part of which there is disposed a seat occupant weight sensing system with a planar pressure sensor such as a foil pressure sensor. From DE 196 02 088 C2 there is known a seat occupancy recognition device in spring-mounted vehicle seat mounts, the recognition device sensing the lengthening of at least one of the springs in the seat part. A force transducer for determining the seat load is known from DE 101 22 316 A1. DE 199 20 378 A1 describes a vehicle seat that is connected to an underbody via weight sensors.

Weight sensors as they may be utilized for sensing the weight in automotive vehicle seats are sold by the industry, the AWS-type sensors of Siemens VDO Automotive AG, Regensburg and the sensors sold in the trade name of MSG by Texas Instruments are referred to; they are silicon strain gages.

When, in practice, such type weight sensors are utilized in the structure of a motor vehicle seat, purely practical problems arise from the fact that assembly tolerances are unavoidable. As contrasted with normal screws, weight sensors cannot tolerate transverse forces. Therefore, assembly must be free of transverse forces.

SUMMARY

It is therefore the object of the invention to develop the prior art proposals for underframes with weight sensing systems using sensors in such a manner that, as far as practicable and taking into account the assembly tolerances, no transverse forces are generated and only forces in the direction that the sensor senses forces are generated. The solution to this object is an underframe of a motor vehicle seat comprising weight sensors for sensing a weight load on the motor vehicle seat, the weight sensors being interposed between a first structure part, such as a seat profile of a longitudinal guide, and a second structure part, such as a console or a seat shell, and sensing the weight exerted through the second structure part on the first structure part.

The weight sensors are fastened to the first structure part and include sensor bolts projecting upward with holes for the sensor bolts provided in the second structure part such that the sensor bolts extend through the holes. Further included is at least one nut, which forms a surrounding grip around the holes, each nut associated with one of the sensor bolts. The holes of the second structure part each define at least one hole region that surrounds the holes and is configured as a cap.

In this underframe, the weight sensors are interposed between two parts of the underframe, namely between the first structure part and the second structure part. The first structure part is for example a seat profile of a longitudinal guide for adjusting the position of the seat forward and backward. The second structure part is for example a console or a seat shell disposed thereon. All the loads generated in the vertical direction are transmitted through the weight sensors. Put another way, an imaginary separating plane in which only the weight sensors are located may be drawn through the underframe. The weight forces acting onto the second structure part are induced into the first structure part through the weight sensors only; there is no other way of transmitting the forces. Usually, there are provided at least four weight sensors, which are more or less associated with the four corners of the underframe.

The weight sensors are appropriately fastened to the first structure part where they may be screwed, soldered or disposed by any other means for example. The weight sensors have a substantially vertically upright sensor bolt that is extending upward and is provided with a threading. The hole regions about the holes in the second structure part through which the sensor bolt extends are configured in the form of a cap. This cap shape allows positioning the sensor bolt in a certain angular range relative to the hole. This permits to correct for mounting inaccuracies. During mounting it is now possible to mount the weight sensor in such a manner that no forces oriented in the x-y plane act thereon due to mounting. As a result, during mounting the sensor bolt is loaded in its longitudinal direction only and the sensor bolt is not loaded in the transverse direction relative to the sensor housing. Accordingly, the weight sensor is not loaded with transverse forces as a result of mounting. Transverse forces may occur later, for example in the event of an accident. But under normal load conditions, the forces occurring are only oriented in the longitudinal direction of the sensor bolt and, as a result thereof, substantially in the z-direction.

In a particularly preferred development, a cap-shaped perforated disk is provided underneath each hole region forming a surrounding grip around the sensor bolt. This lower cap-shaped perforated disk may already be part of the weight sensor itself, that is to say it may be solidly connected thereto, but it may also be a separate part and abut a portion of the sensor bolt. An upper cap-shaped perforated disk is further proposed, the perforated disk forming a surrounding grip around the sensor bolt and resting from the top on the hole region. Above this upper cap-shaped perforated disk there is the nut used for fastening the second structure part. The upper cap-shaped perforated disk may be a separate part, but it may also be configured on and, more specifically, integral with the nut that is screwed onto the sensor bolt. Preferably, there is respectively provided both a lower cap-shaped perforated disk and an upper cap-shaped perforated disk.

The at least one cap-shaped perforated disk allows for improved abutment of the sensor bolt on the second structure part. If both a lower and an upper cap-shaped perforated disk are provided, the hole region of the second structure part is clamped in a planar manner in the mounting state, this allowing for precise fastening. Preferably, the spherical radii of the curvatures of the cap in the hole region and of the cap-shaped perforated disks are intermating. The planar abutment is improved as a result thereof.

It is preferred that the hole be oversized with respect to the outer diameter of the sensor bolt, thus making it possible to orient the sensor bolt within the admissible region of the hole and allowing the sensor bolt to adopt various tilt positions within a conical angular range. The oversize is selected to still achieve sufficiently large abutment surface between the hole region and the at least one cap-shaped perforated disk.

With a separately configured upper cap-shaped perforated disk, it is advantageous to have each of its two end or annular faces equipped with a concave cap surface. For practical use, one cap surface is needed only, the other one is not. A cap-shaped perforated disk with concave surfaces provided on either side thereof has the advantage that it is not necessary to mind the placing direction during assembly. No matter how the cap disk is placed onto the sensor bolt, one of the cap surfaces will always be turned toward the hole region.

The hole region is preferably curved so as to show an arch pointing upward in the positive z-direction, so as to appear convex when viewed from the top (looking in the negative z-direction). The radius of curvature of the cap surface preferably ranges from 10 to 40 mm. Further, the cap surfaces are preferably spherical surfaces.

Preferably, at least two of the various cap surfaces have a common center. It is particularly preferred that all of the cap surfaces have a common center.

Other features and advantages of the invention will become more apparent upon reviewing the appended claims and the following non restrictive description of embodiments of the invention, given by way of example only with reference to the drawing.

DETAILED DESCRIPTION

Figure 1:
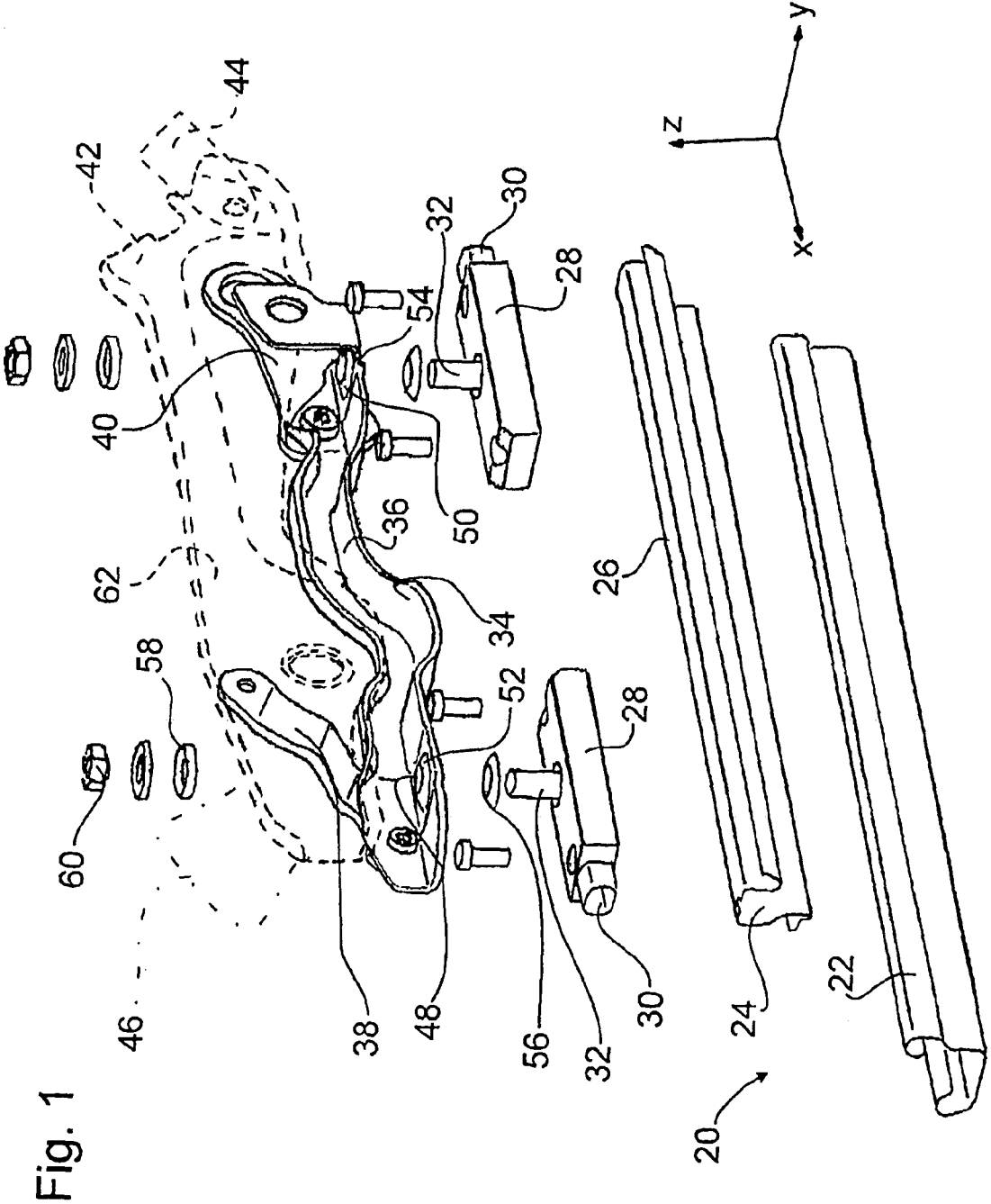
FIG. 1 is a perspective illustration showing an assembly drawing of portions of a side part of an underframe of a motor vehicle seat.
Figure 7:
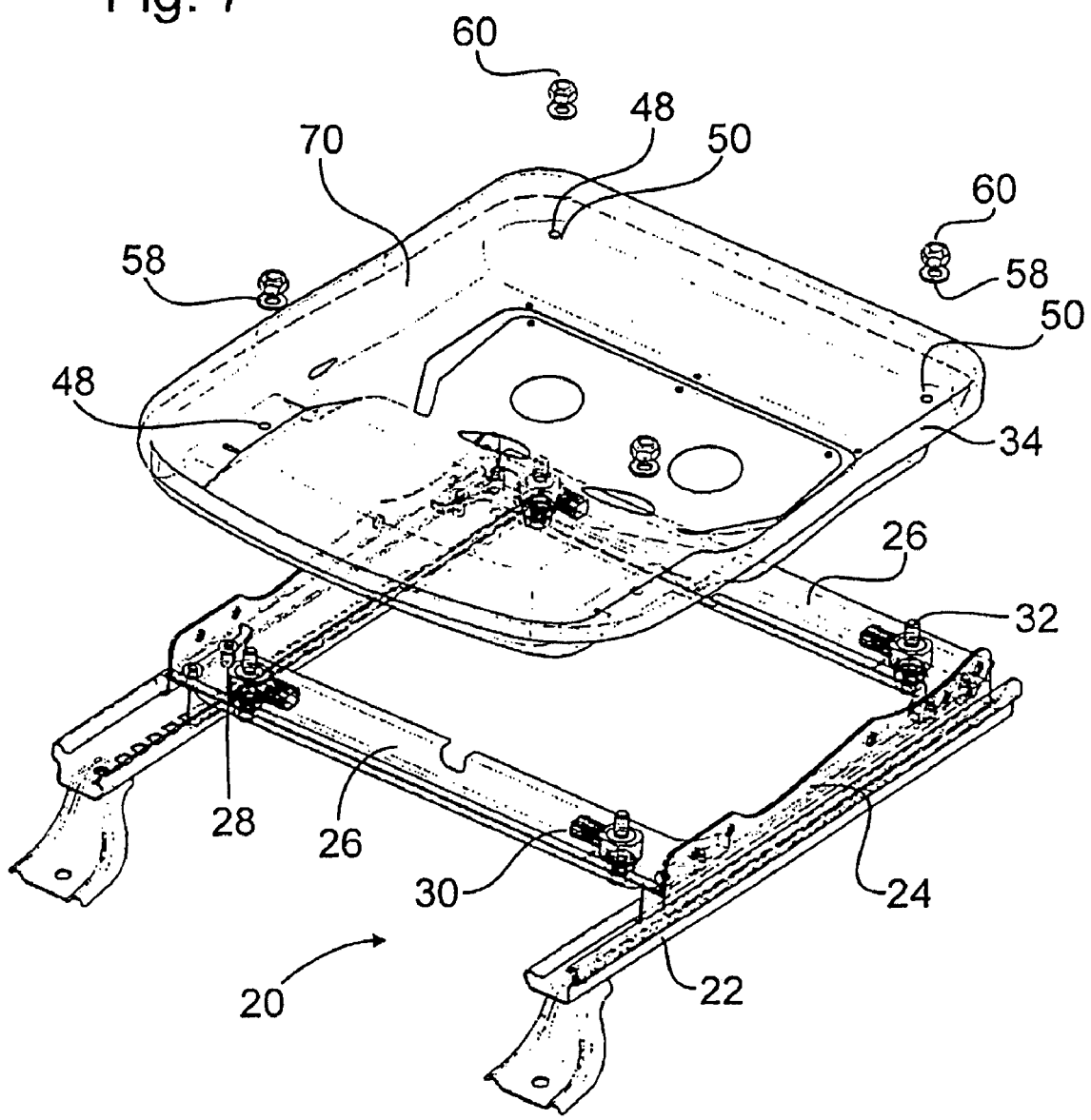
FIG. 7 a perspective illustration showing an assembly drawing of a second configuration of an underframe of a motor vehicle seat.

Of an underframe of a motor vehicle seat, FIG. 1 shows a longitudinal adjustment device 20 of which a pair of rails is shown, the pair of rails comprising one floor profile 22 and one seat profile 24. FIG. 7 shows two pairs of rails. In a known manner, these profiles 22, 24 are slidable with respect to each other in their longitudinal direction, with rolling or sliding means (not shown) being provided for this purpose. Further, there is provided a catch device interposed between the two profiles or an electric drive (both not shown).

In the first exemplary embodiment of the invention, which includes FIGS. 1 through 4, the seat profile 24 forms a first structure part 26. Two weight sensors 28 are fastened thereon, each by means of two screws 27 or other suited fastening means. The sensors used are, for example, but not limited to, the AWS sensors sold by Siemens VDO. They have an electric connection region 30 and a sensor bolt 32 that extends substantially in the z direction and is preferably threaded. Connection with all the other parts of the motor vehicle seat located above the sensors (in FIG. 1) occurs via the sensor bolts 32. If the sensor bolts 32 are untightened from the parts located above them, the seat profile 24 and the floor profile 22 associated therewith can be separated from the motor vehicle seat. Accordingly, the sensors are part of the motor vehicle seat and need not be mounted separately.

Above the weight sensors 28, there is a second structure part 34 that is formed in the present case by a console 36 that extends in the longitudinal direction of the profiles 22, 24 and has substantially the same length as these. The console 36 is connected to a seat side part 42 through a front parallelogram arm 38 and through a rear parallelogram arm 40 that are each linked to the console 36. A seat back 44 is hinged to the seat side part. A seat cushion 46 is carried by the two seat side parts 42 provided in all for each motor vehicle seat. Lastly, a bracket 48 is provided on the console 36 shown and is secured accordingly together therewith. The receiving part (not shown) of a safety belt can be fastened to this bracket.

In the console 36 there are provided holes 48 that are located directly above the sensor bolts 32. They have a diameter that is oversized with respect to the outer diameter of the sensor bolts 32. A hole region 50 surrounds each of the holes 48 and forms a border around each of the holes 48. The hole regions 50 are configured to be caps which, when viewed from the top and contemplated in the negative z direction, are convex and located on a spherical surface. Other forms such as paraboloides are possible. The hole regions 50 are formed from the same sheet material from which the console 36 is made and integrally merge into the remaining region of the console. The hole regions 50 have an upper cap surface 52 that has the convex curvature described and a lower cap surface 54 that shows a mating convex curvature (when looking into the viewing direction z). Beneath this lower cap surface 54, there is provided a lower cap-shaped perforated disk 56. It has an inner hole that is dimensioned sufficiently large for the perforated disk 56 to be freely placed onto the sensor bolt 32. When viewed from the top, the perforated disk has a convex curvature, the curvature conforming to the lower cap surface 54. In the assembled condition, the lower cap-shaped perforated disk 56 fits against the lower cap surface 54. The lower cap-shaped perforated disk 56 in turn abuts the sensor bolt, for example the projection or rim provided thereon. In a preferred embodiment shown in FIG. 5, the lower cap-shaped perforated disk 56 is a component part of the sensor bolt 32.

Likewise, an upper cap-shaped perforated disk 58 is located above the hole region 50, namely above the upper cap surface 52. On its two annular surfaces it has the shape of a convex cap. No matter how it is placed onto the sensor bolt 32, one convex cap surface is pointing downward and can come into contact with the upper cap surface 52. The other convex cap surface of this perforated disk 58 is not needed; it is only provided to prevent mounting errors. The lower cap-shaped perforated disk 56 may also be configured this way.

Above the perforated disk 58, there is located a normal disk and a nut 60. Fastening occurs through this nut 60, which is screwed onto the sensor bolt 32 and tightened for this purpose.

Figure 2:
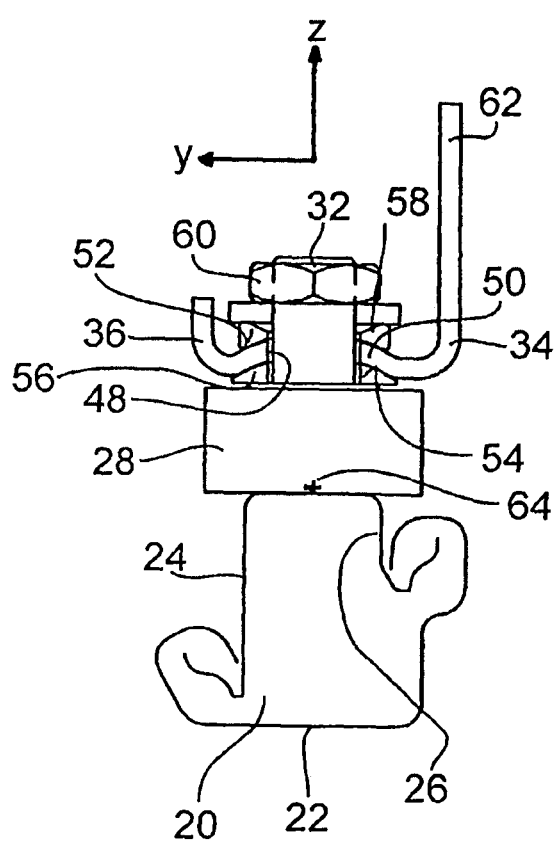
FIG. 2 is an end view of an arrangement similar to FIG. 1.

With reference to the FIGS. 2 through 4, the various positions the two structure parts 26, 34 are capable of adopting with respect to each other will be discussed. At first, FIG. 2 shows the normal, upright position of the second structure part 34; this position corresponding to the ideal mounting position, meaning without any differences due to tolerances and so on. If mounting could be performed in the manner shown in FIG. 2 and performed on all of the four connecting points of the lower part of the underframe with the upper parts located above, no transverse forces due to mounting would occur.

In the configuration according to FIG. 2, the sensor bolt 32 extends centrally through the hole 48 and the free space about the hole 48 can be seen. The lower cap-shaped perforated disk 56 fits against the lower cap surface 54. Likewise the upper cap-shaped perforated disk 58 has one of its two cap surfaces fitting against the upper cap surface 52 with a planar fit. The parts mentioned are held together by the disk and the nut 60. As can be seen from FIG. 3, one leg 62 of the console is vertical, meaning parallel to the x-z plane.

Figure 3:
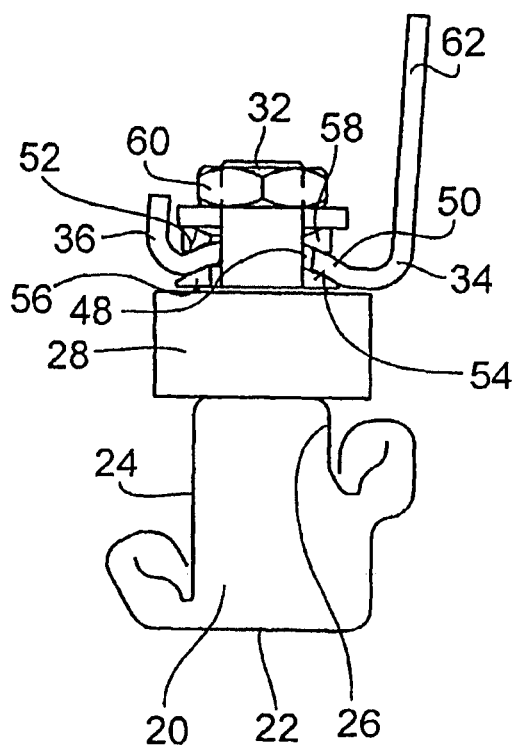
FIG. 3 is an end view like FIG. 2, but in another mounting position of the second structure part.

In the configuration according to FIG. 3, the console 36 is displaced toward the right and additionally as far as practicable inclined toward the right within the free space of the hole 48. As a result, the leg 62 is no longer parallel to the x-z plane but is rather tilted an angle of several degrees, for example of up to 3°, and possibly even of up to 7°. It can be seen that the configuration of the perforated disks 56, 58 is also different from the one in FIG. 2, with the position of the disk remaining the same. The perforated disks 56, 58 are displaced toward the left in the direction counter to the direction of the console 36 so that they overlap the air gap between the hole region 50 and the sensor bolt 32 on the right.

Figure 4:
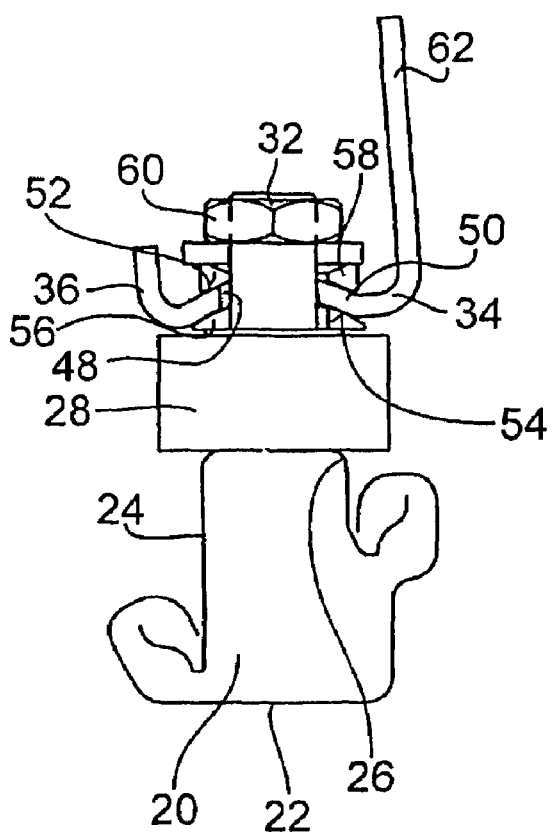
FIG. 4 is an end view like FIG. 2, but again in another mounting position of the second structure part.

FIG. 4 shows a configuration that is the mirror image of the configuration shown in FIG. 3. The hole 48 in the console 36 is now displaced toward the left to such an extent that, on the right side, the threaded bolt contacts the rim of hole 48 and, as a result thereof, the hole region 50. Again, the perforated disks 56, 58 are displaced in the opposite direction, meaning toward the right in the present case. The leg 62 is now tilted toward the left, out of the x-z plane in the direction counter to the tilting direction of FIG. 3.

It can be seen that various positions are possible for the console 36, with all intermediate positions between FIGS. 3 and 4 being admissible. This allows for accommodating tolerances that may have different causes. It is achieved that, in the assembled and unloaded underframe, no transverse forces, meaning no forces in the plane in which the four weight sensors 28 of a motor vehicle seat are located, act onto the weight sensor 28.

In FIG. 3, a center of the spherical surfaces of the cap surfaces 52, 54 and of the cap-shaped perforated disks 56 and 58 is labelled at 64. It can be seen that the cap surfaces lie on concentric spherical surfaces, with the radius of these spherical surfaces lying on the spherical caps being approximately 22 mm and ranging between 15 and 40 mm. The cap surfaces 52, 54 and the cap surfaces on the two perforated disks 56, 58 have a diameter of about double the diameter of the sensor bolt 32. The outer diameter of these cap surfaces may range between 150% and 300% of the diameter of the sensor bolt 32.

Figure 5:
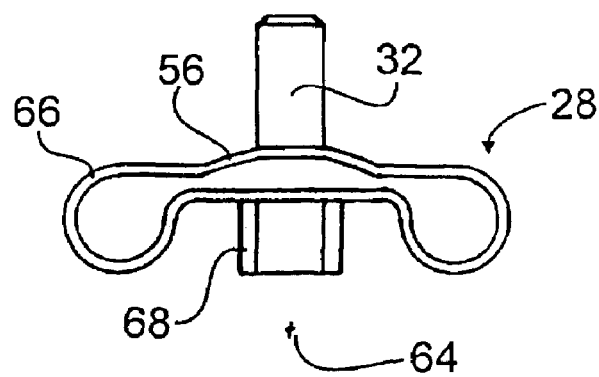
FIG. 5 is a sectional view through a weight sensor with integrated perforated disk.

FIG. 5 is a sectional view of a sensor 28 with a sensor bolt 32 that is disposed on the upper side of an approximately loop-shaped sensor body 66. The sensor body 66 itself is resilient and more specifically has two lateral spring regions. Opposite the sensor bolt 32 there is a screw socket 68 for screw connection with a first structure part 26. Through strain gages or the like, which are disposed in the spring region, the axial displacement in the direction of the longitudinal axis of the sensor bolt 32 and of the coaxial screw socket 68 is sensed. In this sensor 28 configuration, the lower cap-shaped perforated disk 56 is provided directly at the foot region of the sensor bolt 32, with the perforated disk being integrated in the sensor body 66. The cap surface about the foot point of the weight sensor 28 can be seen. It has its center at 64. Accordingly, this implementation has two features. First, the sensor bolt 32 is solidly connected to the part that forms the lower cap-shaped perforated disk 56; put another way, the sensor bolt has a collar which forms the perforated disk 56. Other alternatives are possible; for example, the sensor bolt may comprise a collar or a projection that forms an abutment for the perforated disk 56, but is not associated with the sensor body 66. Second, the lower cap-shaped perforated disk 56 is integrated in the actual sensor and, therefore, does not need to be configured as a separate component part.

Figure 6:
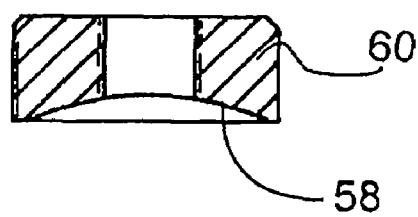
FIG. 6 is a sectional view through a combined part uniting a nut and a perforated disk.
Figure 6:

FIG. 6 shows a corresponding solution for the upper cap-shaped perforated disk 58. The combined part shown is composed of a nut 60 and an upper cap-shaped perforated disk 58. Again, the center 64 of the cap surface is shown.

FIG. 7 shows a complete second exemplary embodiment. As contrasted with the implementation according to the FIGS. 1 through 4, the first structure part 26 is now formed by a front transverse bar and by a rear transverse bar for connecting the two seat profiles 26 together. The weight sensors 28 are disposed at a distance of approximately 3 to 5 cm from the seat profile 24; concretely, they are located in a tub-shaped depression of the profile of the transverse bars 26.

Above the transverse bars 26, there is shown a seat shell 70 defining holes 48 corresponding to the sensor bolts 32. The hole region 50 is formed in the shape of a cap. Above each hole 48 there is provided an upper cap-shaped perforated disk 58 and a nut 60. The perforated disk 58 has a convex cap region on its underside only.

As may be recognized by those skilled in the pertinent art based on the teachings herein, numerous changes and modifications may be made to the above-described underframe of a motor vehicle seat and sensor configuration without departing from the spirit and scope of the invention as defined in the appended claims. Accordingly, this detailed description is to be taken in an illustrative, as opposed to a limiting sense.

What is claimed is:

1. A weight-sensing underframe of a motor vehicle seat comprising:
   weight sensors for sensing a weight load on the motor vehicle seat, the weight sensors being interposed between a first structure part and a second structure part, and sensing the weight exerted through the second structure part on the first structure part,
   the weight sensors being fastened to the first structure part and including sensor bolts projecting upward, holes for the sensor bolts are provided in the second structure part, the sensor bolts extending through the holes, and at least one nut, which forms a surrounding grip around the holes, each nut being associated with one of the sensor bolts, and
   the holes of the second structure part each define at least one hole region that surrounds the holes and is configured as a cap having a convex or concave configuration.

2. The underframe as set forth in claim 1, further comprising at least one of: (i) an upper cap-shaped perforated disk above each hole region forming a surrounding grip around the respective sensor bolt and (ii) a lower cap-shaped perforated disk underneath each hole region forming a surrounding grip around the respective sensor bolt.

3. The underframe as set forth in claim 2, wherein the spherical radii of the curvatures of the cap in the hole region and of at least one of the upper and lower cap-shaped perforated disks are intermating.

4. The underframe as set forth in claim 2, wherein a cap surface of the upper cap-shaped perforated disk and an upper cap surface of the cap are in touching contact, and a cap surface of the lower cap-shaped perforated disk and a lower cap surface of the cap are in touching contact.

5. The underframe as set forth on claim 2, wherein a cap surface of the upper cap-shaped perforated disk and an upper cap surface of the cap are spaced adjacent to each other without a gap therebetween, and a cap surface of the lower cap shaped perforated disk and a lower cap surface of the cap are spaced adjacent to each other without a gap therebetween.

6. The underframe as set forth in claim 1, wherein the holes are oversized with respect to the outer diameter of the sensor bolts, with the oversize being greater than 10% of the outer diameter.

7. The underframe as set forth in claim 6, wherein the holes are oversized with respect to the outer diameter of the sensor bolts, with the oversize being greater than 20% of the outer diameter.

8. The underframe as set forth in claim 2, wherein the upper cap-shaped perforated disk and the nut are formed as a combined part, which includes the nut and the upper cap-shaped perforated disk connected therewith.

9. The underframe as set forth in claim 2, wherein the upper cap-shaped perforated disk has a concave cap surface on either annular surface.

10. The underframe as set forth in claim 2, wherein the sensor bolts have a collar and the respective lower cap-shaped perforated disk fits against the collar.

11. The underframe as set forth in claim 1, wherein each sensor bolt comprises a collar that fonts a cap-shaped perforated disk and defines a convex cap surface that is in contact with a lower concave cap surface of the at least one hole region.

12. The underframe as set forth in claim 1, wherein each cap defines a lower cap surface that is convex and an upper cap surface that is concave.

13. The underframe as set forth in claim 1, wherein each cap is embossed.

14. The underframe as set forth in claim 1, wherein each cap is perforated.

15. The underframe as set forth in claim 1, wherein the radius of each cap ranges from 10 to 25 mm.

16. The underframe as set forth in claim 15, wherein the radius of each cap ranges from 17 to 20 mm.

17. The underframe as set forth in claim 4, wherein at least two of: (i) the cap surface of the upper cap-shaped perforated disk, (ii) the upper cap surface of the cap, (iii) the cap surface of the lower cap-shaped perforated disk and (iv) the lower cap surface of the cap, have a common center.

18. The underframe as set forth in claim 17, wherein all of the cap surfaces have a common center.

19. The underframe as set forth in claim 1, wherein the first structural part is a seat profile of a longitudinal guide.

20. The underframe as set forth in claim 1, wherein the second structural part is at least one of (i) a console and (ii) a seat shell.

* * * * *